(12) United States Patent
Schick

(10) Patent No.: US 7,158,018 B2
(45) Date of Patent: Jan. 2, 2007

(54) PNEUMATIC TIRE MOUNTABLE ON A WHEEL RIM AND SENSOR NET, ROTATION MEASUREMENT UNIT AND VEHICLE MONITORING SYSTEM FOR SUCH TIRE

(75) Inventor: Bernhard Schick, Karlsruhe (DE)

(73) Assignee: TÜV Automotive GmbH (DE)

( * ) Notice: Subject to any disclaimer, the term of this patent is extended or adjusted under 35 U.S.C. 154(b) by 382 days.

(21) Appl. No.: 10/422,031

(22) Filed: Apr. 23, 2003

(65) Prior Publication Data

US 2003/0201044 A1 Oct. 30, 2003

(30) Foreign Application Priority Data

Apr. 26, 2002 (DE) ................. 102 18 781

(51) Int. Cl.
*B60C 23/00* (2006.01)
(52) U.S. Cl. .................. 340/442; 73/146; 152/152.1
(58) Field of Classification Search ................. None
See application file for complete search history.

(56) References Cited

U.S. PATENT DOCUMENTS

| | | | |
|---|---|---|---|
| 4,570,152 A | 2/1986 | Melton et al. | |
| 4,909,074 A | 3/1990 | Gerresheim et al. | |
| 5,071,259 A | 12/1991 | Metzger et al. | |
| 5,502,433 A * | 3/1996 | Breuer et al. ................ | 340/438 |
| 5,573,610 A | 11/1996 | Koch et al. | |
| 5,663,496 A | 9/1997 | Handfield et al. | |
| 5,913,240 A * | 6/1999 | Drahne et al. ................ | 73/146 |
| 5,939,977 A | 8/1999 | Monson | |
| 5,964,265 A * | 10/1999 | Becherer ................ | 152/152.1 |
| 6,651,495 B1 * | 11/2003 | Lonsdale et al. .............. | 73/146 |
| 6,888,471 B1 * | 5/2005 | Elsner et al. ............ | 340/686.3 |
| 6,958,615 B1 * | 10/2005 | Poulbot et al. .............. | 324/661 |
| 6,959,593 B1 * | 11/2005 | Mancosu et al. .............. | 73/146 |
| 2003/0117275 A1 | 6/2003 | Watkins | |
| 2004/0061601 A1 * | 4/2004 | Freakes et al. .............. | 340/442 |
| 2004/0196147 A1 | 10/2004 | Albuquerque | |
| 2004/0196148 A1 | 10/2004 | Albuquerque | |

FOREIGN PATENT DOCUMENTS

| | | |
|---|---|---|
| DE | 19745734 | 4/1999 |
| WO | WO 02/20287 | 3/2002 |

OTHER PUBLICATIONS

Fraunhaufer Magazine Article of 4. 2001 (pp. 8-12), "Polytronic: Chips von der Rolle" by Franz Miller.

* cited by examiner

*Primary Examiner*—Benjamin C. Lee
(74) *Attorney, Agent, or Firm*—Robert W Becker & Associates; Robert W Becker

(57) ABSTRACT

A pneumatic tire mountable of the rim of a vehicle wheel has a toroidal structure including a pair of beads for receipt on the rim of a vehicle wheel such that the pneumatic tire is secured to the vehicle wheel for rotation therewith. The pneumatic tire also includes a tread band surface at the radially outermost location of the toroidal structure for contacting a surface along which the tire rolls. A plurality of sensor elements are disposed in the tire for sensing at least one operational parameter of the tire, with at least some of the sensor elements being in sensing arrangement with the tread band surface and the sensor elements being operable to permit reading of data concerning any tire operational parameter which is sensed by the sensor elements.

19 Claims, 3 Drawing Sheets

PNEUMATIC TIRE MOUNTABLE ON A WHEEL RIM AND SENSOR NET, ROTATION MEASUREMENT UNIT AND VEHICLE MONITORING SYSTEM FOR SUCH TIRE

BACKGROUND OF THE INVENTION

The present invention relates to a pneumatic tire mountable on the rim of a wheel. The present invention further relates to a sensor net which is vulcanized into a tire as well as a rotation measurement unit to be mounted in a tire and a vehicle monitoring system.

The tires on the wheels of a vehicle mediate the contact between the vehicle and the driving surface. The tires perform a wide variety of roles: they influence the rolling comfort, the resistance to the vehicle's travel, the security of the vehicle's driving operation, and much more and are, consequently, a decisive component with respect to the functioning fitness of the vehicle. Tires are subjected to considerable demands in operation. In addition to environmental driving influences such as gasses, light, and fluids, as well as mechanical demands such as vehicle loading conditions, sudden stopping and tire tracking, the filled tire pressure—that is, the air pressure operating in the interior of the tire—is a point of reference concerning the duration of the operational life and the functional conditions of the tire. In particular, too low an air pressure leads to excessive rolling energy of the tire, whereby the tire temperature in, in particular, the region of the tire shoulder, increases. A high temperature not only damages the tire rubber itself but also damages the interconnection of the tire rubber with the carcass and additional tire build-ups such as, for example, a tire belt. In total, it is important that the power loss attributable to a tire, which, in the same manner as mechanical demands, also make their presence known via an increased tire temperature, remains small.

SUMMARY OF THE INVENTION

The present invention provides a solution to the challenge of offering a possibility by which the status of the reliable functioning of a pneumatic tire mounted on the rim of a wheel can be evaluated.

The core concept is characterized by a pneumatic tire having a plurality of sensors mounted therein, whereupon the operational parameters of the tire such as temperature, pressure, mechanical loading, and so forth can be registered or captured and such captured operational parameter values can not only be available for evaluation for the purpose of drawing conclusions about the tire itself but, as well, can also be available for drawing conclusions therefrom concerning the operational parameters of the vehicle.

The present invention relates to a pneumatic tire which is mountable on the rim of a wheel on all types of vehicles including, as well, aviation transport.

BRIEF DESCRIPTION OF THE DRAWINGS

The object of the present invention will appear more clearly from the following specification in conjunction with the accompanying schematic drawings, in which.

DETAILED DESCRIPTION OF THE PREFERRED EMBODIMENT

Figure 1:
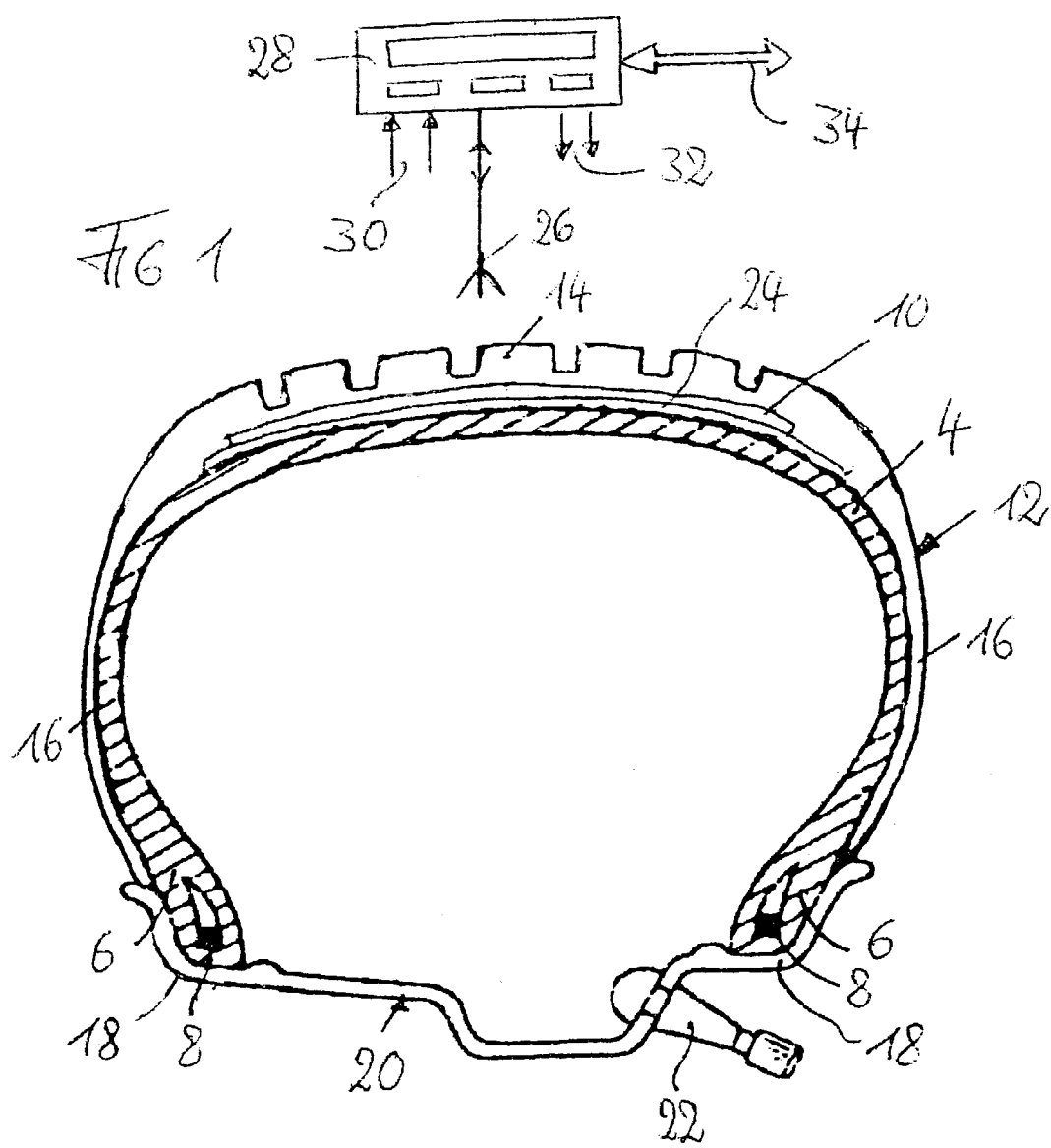
FIG. 1 is an enlarged radial sectional view through the upper half of a vehicle tire and showing as well portions of one embodiment of the vehicle monitoring system of the present invention.

FIG. 1 shows, in radial sectional view, an upper portion of a tire, the tire comprising a carcass 4 which has, for example, two radially extending plies formed of rayon cords and terminating radially inwardly in beads 6. Bead cores 8 are mounted in the radially inner end regions of the beads 6 for stabilizing the beads. A belt 10 is arranged in the radially outer region of the carcass 4 and is comprised, for example, of two crossed or biased plies formed of steel cords and two completely annularly extending plies formed of nylon cords. A rubber layer 12 is vulcanized over the carcass 4, or, respectively, the belt 10, the rubber layer forming in its radially outermost region the tread band 14 and forming, in its lateral or side regions, relatively thin sidewalls 16. The beads 6 are received axially inwardly of the shoulders 18 of a rim 20 which itself is integrally formed with a non-illustrated wheel. The tire is of the type having an air sealed construction so that the tire interior can be provided with pressurized air via a valve 22 extending through the rim.

The afore-described tire construction is conventional and is not further described herein. The afore-described tire construction is to be understood as only an exemplary description of a tire. The invention can also be deployed for tires of a different construction.

In accordance with the present invention, a sensor system or net 24 is disposed between the belt 10 and the carcass 4 by, for example, lamination or vulcanization of the sensor net into the tire and the sensor net comprises sensor units which are not illustrated in FIG. 1. The sensor units can be interrogated by an antenna 26 fixedly secured to the vehicle and connected to a control device 28 which itself can be provided with vehicle sensors or with inputs 30, outputs 32, and a data connector 34 connected to a bus system.

Figure 2:
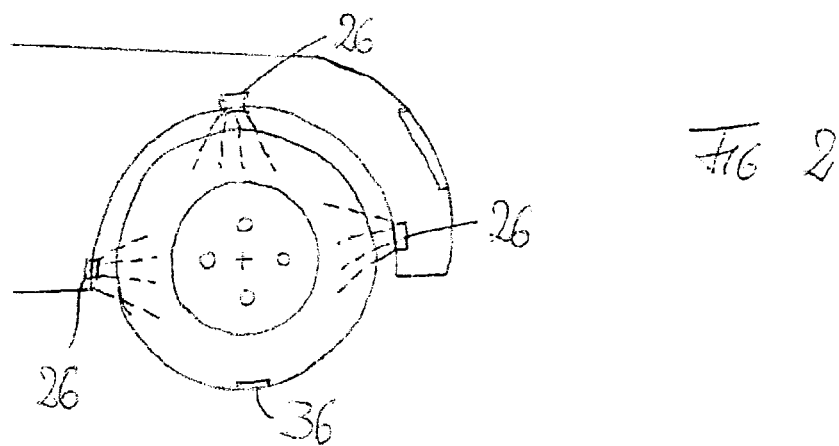
FIG. 2 is a schematic view of one configuration for interrogating and receiving data concerning a tire from a tire monitoring system of the present invention.

FIG. 2 schematically shows three antennas 26 arranged at circumferential spacings from one another around a fender of a vehicle and, as required, arranged as well offset to one another relative to the transverse direction of the vehicle, the antennas 26 communicating with at least one transponder 36 contained in the sensor net 24 or connected to a node of the sensor net. In correspondence with the arrangement of the transponder(s), a greater or lesser number of vehicle-secured antennas can be provided.

Figure 3:
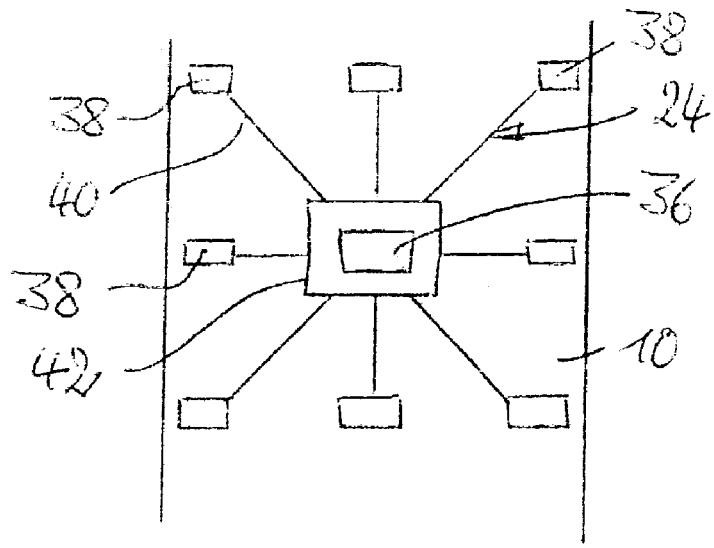
FIG. 3 is a view of a portion of one configuration of a sensor net of a tire monitoring system of the present invention which would be wound about a tire in its installed disposition but being shown in a flattened, non-wound view.
Figure 4:
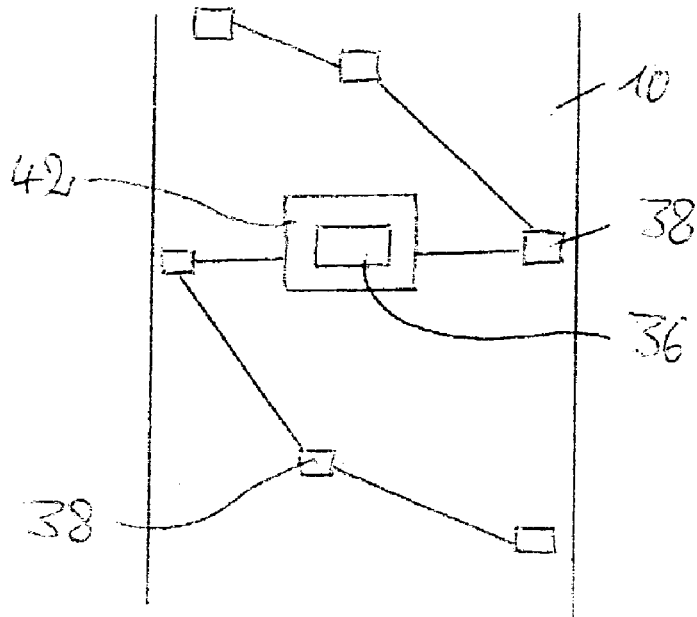
FIG. 4 is a view of a portion of another configuration of a sensor net of a tire monitoring system of the present invention which would be wound about a tire in its installed disposition but being shown in a flattened, non-wound view.
Figure 5:
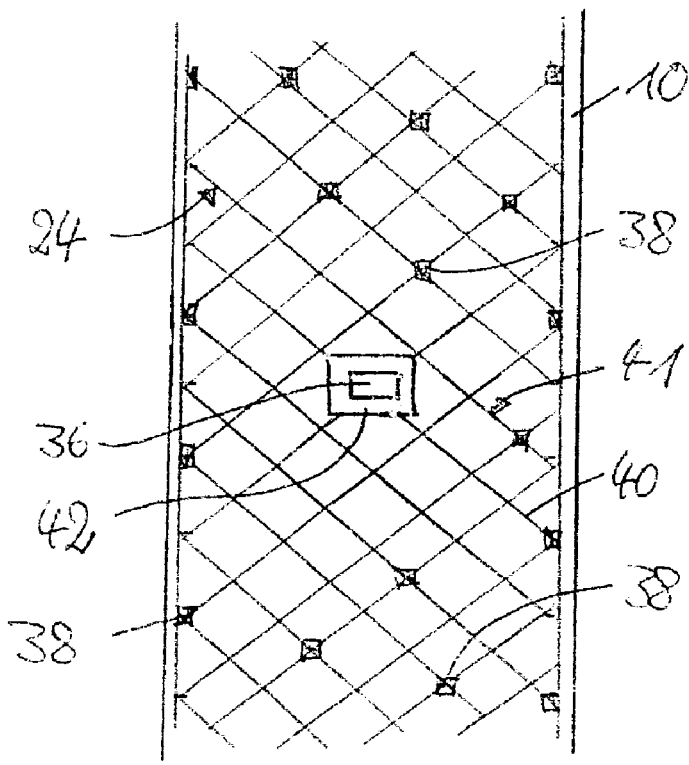
FIG. 5 is a view of a portion of a further configuration of a sensor net of a tire monitoring system of the present invention which would be wound about a tire in its installed disposition but being shown in a flattened, non-wound view.

FIGS. 3–5 each show, as viewed in the tire interior, a portion of a respective configuration of the sensor net 24 with the belt 10 being shown thereunder, wherein both the sensor net and the belt are shown in a flattened, non-wound view.

In the configuration shown in FIG. 3, the sensor units 38 contained in the sensor net 24 are each connected via a respective connector 40 with a node 42 which itself contains the transponder 36.

In the configuration shown in FIG. 4, a plurality of sensors 38, arranged in angularly serially-following manner with one another around the tire, are each connected to a single common connector 40 which itself is connected with the transponder 36.

FIG. 5 shows a configuration in which the connectors 40 form a rhombus-shaped net 41 to which is connected the node 42 with the transponder 36.

The cord-like connectors 40 are preferably comprised of steel cable, carbon, conductive plastic or other electrically conductive connectors such as, for example, those conventionally known in the vehicle environment, which, for the purpose of providing the necessary insulation and tension or strain relief, are combined with additional materials or fibers such as, for example, carbon, aramid, steel cord synthetic material, conductive plastic ceramic fibers, and so forth, whereby the connection material cords or, respectively, the connectors, must be chemical and heat resistant in order that such components are not damaged during the vulcanization of the tire, and such components must possess mechanical properties which can survive the operational demands of the tire. In accordance with the respective deployed data processing technology, each sensor unit 38 is connected, via one or several connectors electrically insulated from one another, to the central node 42, or the individual sensor units can be connected in a net via connectors, if the sensor units comprise, for example, their own processors and can be individually queried by the transponder 36 via multi-plex or bus technology. Within the connector- or, respectively, the cord-, net 41, the switching arrangements can be realized as are illustrated in FIG. 2 or in FIG. 3.

The requisite connectors 40 collectively configure, as a function of the desired number of sensors or, respectively, the mounting of sensor units into the tire, a connector net 41 which, together with the sensor units 38, forms the sensor net 24 which is disposed between the belt 10 and the carcass 4 and is vulcanized into the tire during the production of the tire. The width of the sensor net, which, in FIG. 1, is somewhat larger than the width of the belt 10, can, depending upon the desired sensor units extend into the sidewalls 16 or can extend in less-than-full width coverage over the belt 10. In the same vein, the sensor net 24 need not necessarily extend around the entire periphery of the tire (as viewed in its rolling direction). The individual cords of the net can be configured with multiple strands. A reference measure or mass for all of the sensor units 38 and the transponder 36 can be provided by the steel ply of the belt 10 to which each sensor unit and the transponder 36 is connected. In the illustrated embodiments, the node 42 forms, for example, a base substrate with connective paths for connecting, on the one hand, the connectors 40 and, on the other hand, the elements connected to the base substrate of the transponder such as a processor, a memory, antennas, and, as may be optionally provided, an energy supply. In accordance with the respective configuration of the monitoring arrangement, mechanically stable cords can extend through the entire substrate or can be connected with extension elements operable to measure the application of force, such extension elements being integrated into the substrate.

The sensor units 38 can each monitor a respectively different physical metric or operational parameter of the tire. The sensor units 38 can comprise several sensor elements including, for example, one for measuring the temperature, one for measuring the air pressure, and one for measuring the pressure or stress applied by the belt, as well as extension measurement cells for measuring the pressure applied by the cords or for measuring the extensions of the cords (FIG. 5) which are a reference measure for the respective localized extension of the tire structure.

Via a distribution of the sensor units over the tire road surface contacting surfaces (contact surfaces) sufficient to provide sensing coverage, the respective components of information are available in a form which permits the creation of an illustrative representation of the respective measured metrics across the respective surface. This illustrative representation can, as is described hereinafter in more detail, be advantageously exploited in numerous ways.

Pressure measurements can, for example, be undertaken by pressure-sensitive foils or micro measurement cells having piezo elements or capacitors. Extension or expansion of the tire structure can be measured by extension-insensitive foils or micro measurement cells (piezo-electrically or per the capacitor principle). The temperature evaluation can, in similar manner, be evaluated in a piezo-electric manner by means of resistance measurement elements, and so forth. The measurement principles are conventionally known and are not further described herein in detail.

Figure 6:
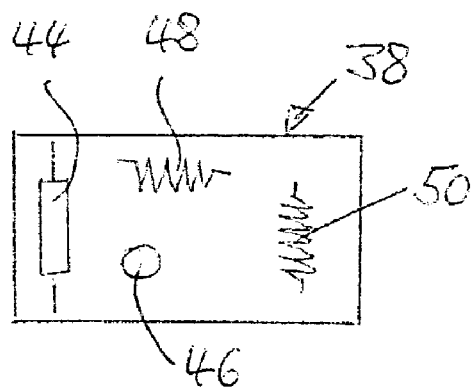
FIG. 6 is a schematic view of one configuration of a sensor of a tire monitoring system of the present invention.

FIG. 6 shows a schematic view of a sensor unit 38 having a temperature measurement element 44, a pressure measurement element 46, and two extension measurement elements 48 and 50 disposed perpendicularly to one another.

To effect the passing over or transmission of the data registered or captured by the sensor units 38, numerous different possibilities are available. One advantageous possibility is the possibility of transmission of the data via the transponder 36, which is associated with the node 42, with which the sensor units 38 themselves are connected. The transponder is inductively provided with electrical energy by movement of the transponder past the antennas 26. It is to be understood that the transponder 36 can, in an advantageous manner, be arranged at a spacing which is not immediately underneath the belt 10 but which is, instead, a spacing of the transponder laterally adjacent the belt so that the transponder is not shielded off or blocked from the antennas 26 by the belt. The data transmission from the transponder 36 to the control device 28 via the single antenna 26 or, respectively, the antennas 26, can be effected online, in that each of the sensor units is individually interrogated; in another process, a memory controlled by a processor of the transponder can cyclically interrogate and read the data of the individual sensor units, intermediately store such data, and can then itself be interrogated via, for example, a conventional sample-hold process. The interrogation and reading of the sensor units can be undertaken in a time-controlled manner or in a per-rotation controlled manner. The transponder and the therewith-associated transmission technology are conventionally known whereupon such is not further described in detail herein.

As an example of the sensing operation, during each rotation of the wheel, a value such as a temperature value, a pressure value, an extension or expansion value, and so forth captured by a sensor can be read so that, following a corresponding count of revolutions of the wheel, a complete picture of the tire is formed. In correspondence with the available data processing capacity, several measurement values can be simultaneously interrogated and read so that a complete picture (footprint) of the tire is rapidly produced. In this connection, those metrics which are relatively less dynamic such as, for example, temperatures, can be interrogated and read with less frequency as compared to the reading frequency of rapidly changing metrics such as, for example, the pressure and extension metrics. It is to be understood that the mounting of the temperature sensor elements is effected, above all else, in the edge region of the belt 10 in the tire shoulder as these are the respective locations of the tires at which will occur, when the air pressure is too low or the tire is subjected to relatively high loading, the relatively highest temperatures which may possibly damage the tire.

The interrogation and reading via a transponder of the data, which is effected via corresponding electronic components (memory, processor) providing a data processing capacity, is not indispensable. The individual sensor elements can, for example, be comprised of series circuits with sensor-specific resonance frequencies so that the sensors can be immediately interrogated and read in correspondence with their frequency specification. The measurement signal can be provided by detuning the resonance frequency or can be a modulation of the resonance frequency. The central nodes with their therewith-connected transponder 36 are not required in this manner of data transmission.

The cord or connector net 41 is not an indispensable component of the inventive device. In view of the increasing miniaturization of transponders in which sensor elements are integrated and which are, in their overall configuration, bendable or, respectively, flexible, and their lower costs, it is possible to dispose a plurality of individual sensor units with integrated transponders as well as, if optionally provided, additional dedicated energy supplies, in function-appropriate locations in tires and to interrogate and read data from such sensor units in a non-contact manner. Such bendable synthetic chips with sufficient temperature stability and resistance are described, for example, in the article by F. Miller "Polytronic: Chips von der Rolle", *Fraunhofer Magazine* 4, 2001, pages 8–12. Such chips can be individually mounted in the tire or can be mounted as a pre-assembled component group in a cord net.

The data captured by the afore-described measurement technology, which is captured by virtue of the sensors units distributed within the "intelligent" tire, can be evaluated in numerous ways. The control device comprises, in this connection, a microprocessor and storage units so that the operation of an interrogation and evaluation unit contained in the control device is controlled and the results are displayed at a display unit. The temperature course or path of the tire can be stored in that, with respect to the length of the tire operational life or, respectively, damage to the tire, there is criticality associated with how long a location on the tire shoulder has been subjected to a temperature lying above a threshold value. The presence of unallowably high temperatures can permit a conclusion that the tire has an inadequate air pressure. In combination with the mechanical demands on the tire there occurs, for example, extensions or, respectively, deformations, in the plane of the road surface contact surface which can lead to false sudden stopping and tire tracking so that a corresponding false display is displayed by the display device. Also, due to the non-symmetrical distribution of temperatures in the tire, feedback concerning defective vehicle conditions can be generated such as, for example, feedback concerning locally heated locations showing a defective exhaust gas location, false axle alignment positions, and so forth. The footprint of the extension and/or pressure distribution within the tire road contact surface (contact surface) permits observations concerning the overloaded frictional forces (longitudinal and transverse), the axle alignment positions, the wear, the rolling resistance, the aqua-planing relationships, and so forth. In addition to offering diagnosis possibilities (for example, the axle alignment positions, ply defects, and so forth), the evaluated pressure oscillations can lead to an observation concerning mechanical or structural tire defects.

Additionally, one can forward the evaluated values to vehicle control and warning systems such as, for example, a vehicle stability system or comfort system, while taking into account, if optionally provided, information about the vehicle speed and the instantaneous motor performance, whereupon such systems can adjust the vehicle suspension characteristics in correspondence with the road and vehicle conditions.

In total, the invention not only provides the possibility to register the static and dynamic demands on the tire and, thereby, to determine the influence thereof on power loss, to monitor the function fitness of the tire, and venture a prognosis of the duration of its operating life, but the invention provides, as well, the possibility to evaluate the captured detailed tire data to draw conclusions concerning vehicle defects and to monitor the condition of the vehicle.

Figure 7:
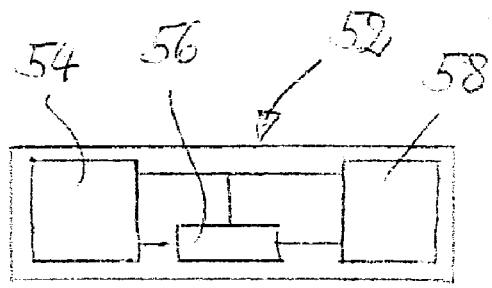
FIG. 7 is a schematic view of an autonomous or self sufficient sensor unit of a tire monitoring system of the present invention.

FIG. 7 shows an autonomous or self sufficient rotation measurement unit 52 which can be integrated into the sensor net 24 or can be separately disposed in the tire, by vulcanization into the tire, as a self-standing component. The rotation measurement unit 52 comprises a sensor element 54 which emits a signal during each rotation of the tire. The sensor element 54 can, for example, comprise a piezo element which is pressed against with oscillating force by a suspended mass during rotation of the tire so that a voltage signal emitted by the sensor element 54 correspondingly oscillates. The output signal of the sensor element 54 permits an evaluation of the energy supply condition of the sensor element with the requisite energy to be supplied being correspondingly made ready in an energy supply unit 56 and the output signal of the sensor element, in addition, permits the generation of a signal integrated into the rotation of the tire, in that, as a result of each oscillation of the output signal caused by a rotation of the tire, the count status maintained in a memory unit 58 increments by a single count.

Via the autonomous rotation measurement unit 52 integrated into the tire, the tire itself generates a signal which is independent from that produced by the vehicle concerning the count of the tire rotations. The count status of the memory unit 58 can be, consequently, interrogated and read in a repair station. For the purposes of preventing manipulation of the actual tire rotation count, a setting back of the memory unit 58 can be prevented or permitted by only an unauthorized user.

Alternatively, the rotation measurement unit can be integrated into a valve such as, for example, the valve 22 shown in FIG. 1, fixedly secured to the wheel rim.

In a similar manner to the energization of the rotation measurement unit 52, the sensors 38 and/or the transponder 36 can be provided with energy generated by rotation of the tire as well. Moreover, memory elements can be provided having pre-set capability to record critical metrics relating to the tire so that such critical metrics are stored in the tire itself, whereupon a quality monitoring of the tire concerning, for example, flank damage or excessive mechanical demands on the tire, can be registered via interrogation and reading of the corresponding memory elements.

The specification incorporates by reference the disclosure of German priority document 102 18 781.9 filed Apr. 26, 2002.

The present invention is, of course, in no way restricted to the specific disclosure of the specification and drawings, but also encompasses any modifications within the scope of the appended claims.

What is claimed is:

1. A pneumatic tire arranged and constructed to be mounted on a rim of a vehicle wheel, comprising:
   a plurality of sensor elements embedded in a tire material within a region of the tire bounded by a tire tread, the sensor elements being arranged and constructed to measure and read out at least one physical value prevailing in the region of the tire tread, the at least one physical value being selected from temperature, pressure and mechanical loading, wherein the plurality of sensor elements is secured to a sensor net that has been vulcanized or laminated to the tire material, and wherein the sensor net is electrically conductive and electrically connects the plurality of sensor elements to a central unit.

2. A pneumatic tire according to claim 1, further comprising at least one sensor element arranged and constructed to detect the temperature of the tire material in a shoulder region of the tire.

3. A pneumatic tire according to claim 1, wherein the sensor elements are distributed over the tire tread so as to provide sensing coverage of the respective physical values across the surface of the tire tread.

4. A pneumatic tire according to claim 1, wherein the sensor net is disposed radially inwardly of a belt of the tire, and the belt is arranged and constructed to form a ground connection between the sensor elements and the central unit.

5. A pneumatic tire according to claim 1, wherein the sensor elements are individually addressable by the central unit.

6. A pneumatic tire according to claim 1, wherein the central unit comprises a memory arranged and constructed to store measured physical values read out from the sensor units.

7. A pneumatic tire according to claim 6, wherein the central unit further comprises a transponder.

8. A pneumatic tire according to claim 1, wherein at least one sensor element comprises an integral transponder.

9. A pneumatic tire according to claim 1, wherein a rotation counting unit is arranged and constructed to count rotations of the tire and to store the counted number of rotations.

10. A pneumatic tire according to claim 1, further comprising means for generating electrical energy based upon tire rotation.

11. A vehicle, comprising:
    a pneumatic tire according to claim 1,
    a control device comprising a read-out unit and at least one antenna arranged and constructed to wirelessly read out data supplied by the sensor elements,
    an evaluation unit arranged and constructed to evaluate said read out data from the control device in accordance with predetermined algorithms, and
    a display unit arranged and constructed to display at least one tire condition determined from said read out data.

12. A pneumatic tire according to claim 1, wherein at least one transponder is connected to the sensor net and is arranged and constructed to wireless transmit the at least one measured physical value.

13. A pneumatic tire according to claim 12, wherein the width of the sensor net is wider than the width of the belt.

14. A vehicle, comprising:
    a pneumatic tire according to claim 1, which tire further comprises:
    a rotation counting unit is arranged and constructed to count rotations of the tire and to store the counted number of rotations, and
    means for generating electrical energy based upon tire rotation,
    a control device comprising a read-out unit and at least one antenna arranged and constructed to wirelessly read out data supplied by the sensor elements and the rotation counting unit,
    an evaluation unit arranged and constructed to evaluate said read out data from the control device in accordance with predetermined algorithms,
    a display unit arranged and constructed to display at least one tire condition determined from said read out data.

15. A pneumatic tire arranged and constructed to be mounted on a rim of a vehicle wheel, comprising:
    a plurality of sensor elements embedded in a tire material within a region of the tire bounded by a tire tread, the sensor elements being arranged and constructed to measure and read out at least one physical value prevailing in the region of the tire tread, the at least one physical value being selected from temperature, pressure and mechanical loading, wherein at least one sensor element is arranged and constructed to measure temperature, at least one sensor element is arranged and constructed to measure pressure and at least two sensor elements are arranged and constructed perpendicular to each other to measure stretching of the tire material, wherein the plurality of sensor elements is secured to a sensor net that has been vulcanized or laminated to the tire material, wherein the width of the sensor net is wider than the width of the belt, and wherein at least one transponder is connected to the sensor net and is arranged and constructed to wireless transmit the at least one measured physical value.

16. A pneumatic tire according to claim 15, wherein at least one sensor element comprises a piezo element.

17. A pneumatic tire according to claim 16, further comprising at least one temperature sensor element disposed in a shoulder region of the tire.

18. A pneumatic tire according to claim 17, wherein the sensor elements are distributed in the region of the tire proximal to the tire tread so as to provide sensing coverage of the respective physical values across the surface of the tire tread, the sensor net is electrically conductive and electrically connects the plurality of sensor elements to a central unit, the belt is arranged and constructed to form a ground connection between the sensor elements and the central unit, the sensor elements are individually addressable by the central unit, the central unit comprises a memory arranged and constructed to store measured physical values read out from the sensor units and a rotation counting unit is electrically coupled to the central unit and is arranged and constructed to count rotations of the tire and to store the counted number of rotations.

19. A vehicle, comprising:
    a pneumatic tire according to claim 18,
    a control device comprising a read-out unit and at least one antenna arranged and constructed to wirelessly read out data supplied by the sensor elements,
    an evaluation unit arranged and constructed to evaluate said read out data from the control device in accordance with predetermined algorithms, and
    a display unit arranged and constructed to display at least one tire condition determined from said read out data.

* * * * *